US006690456B2

(12) United States Patent
Bux et al.

(10) Patent No.: US 6,690,456 B2
(45) Date of Patent: Feb. 10, 2004

(54) WHEEL ALIGNMENT APPARATUS

(75) Inventors: Herrmann Bux, Adelzhausen (DE); Stefan Käfer, Munich (DE); Stefan Schommer, Unterschleißheim (DE)

(73) Assignee: Beissbarth GmbH, Munich (DE)

( * ) Notice: Subject to any disclaimer, the term of this patent is extended or adjusted under 35 U.S.C. 154(b) by 0 days.

(21) Appl. No.: 09/945,440

(22) Filed: Aug. 31, 2001

(65) Prior Publication Data

US 2002/0080343 A1 Jun. 27, 2002

(30) Foreign Application Priority Data

Sep. 2, 2000 (DE) .................................. SN 100 43 354

(51) Int. Cl.[7] .......................... G01B 11/26; G01B 13/18; G01B 21/22; G01B 5/24
(52) U.S. Cl. .................. 356/139.09; 33/203.18
(58) Field of Search ........................ 356/139.09, 155; 33/203.18, 288; 700/279

(56) References Cited

U.S. PATENT DOCUMENTS

| | | | |
|---|---|---|---|
| 4,931,964 A | | 6/1990 | Titsworth et al. |
| 5,531,030 A | * | 7/1996 | Dale, Jr. .................. 33/203.18 |
| 2002/0027651 A1 | * | 3/2002 | Jackson et al. ........ 356/139.09 |

FOREIGN PATENT DOCUMENTS

| | | | |
|---|---|---|---|
| EP | 1 003 011 A1 | | 5/2000 |
| WO | 0171280 | * | 9/2001 |

* cited by examiner

Primary Examiner—Stephen C. Buczinski
(74) Attorney, Agent, or Firm—Blakely, Sokoloff, Taylor & Zafman LLP

(57) ABSTRACT

A wheel alignment apparatus has measurement heads for determining wheel positions of wheels of a motor vehicle. Each measurement head comprises at least one camera which is the direct to a measurement target arranged in the field of view of the camera and positioned in a well defined relationship to the wheel of the motor vehicle. Pictures taken by the camera are evaluated by an evaluation unit in order to determined the spatial position of the measurement target and, thereby, the wheel with respect to the position of the camera and the measurement head respectively. The wheel alignment apparatus wheel alignment apparatus comprises an optical reference system integrated into the measurement heads for calibrating the measurement heads of the wheel alignment apparatus as to the position of the measurement heads with respect to each other.

17 Claims, 5 Drawing Sheets

WHEEL ALIGNMENT APPARATUS

BACKGROUND OF THE INVENTION

The invention relates to a wheel alignment apparatus having measurement heads for determining wheel positions of wheels of a motor vehicle wherein each measurement head comprises at least one camera which is the direct to a measurement target arranged in the field of view of the camera and positioned in a well defined relationship to the wheel of the motor vehicle, and wherein pictures taken by the camera are evaluated by an evaluation unit in order to determine the spatial position of the measurement target and, thereby, of the wheel with respect to the position of the camera and the measurement head respectively.

Such so called contact free wheel alignment apparatus are for example known from EP 0895056, EP 0943890 and DE 19757763 A1. In such wheel alignment apparatus, the measuring heads which serve for determining the wheel positions of the wheels of the motor vehicle on a measurement site, have to be adjusted with respect to each other prior to the actual measurement, and this imposes problems in practice.

In the wheel alignment apparatus known form EP 0895056, the adjustment of the measuring heads with respect to each other is carried out in that the measurement heads are arranged on a common frame on the measuring site such that the relative position of the measurement heads with respect to each other is known. The measurement heads are, however, moveably guided such that accuracy problems arise at the guiding means. Such an arrangement has the deficiency that the distances from the measurement heads to the measurement targets are quite wide such that the resolution of the camera imposes a problem.

In the wheel alignment apparatus known from EP 0943890, the positioning of the measurement heads with respect to each other is carried out in that reference targets are arranged on the measurement site by means of which reference targets the measurement heads are adjusted or positioned with respect to each other. Since the reference targets are arranged on the measurement site in front of the vehicle, the distances from the reference targets to the measurement heads at the real wheels is quite long so that it is difficult to a achieve the required accuracy in calibrating the measurement heads.

In the wheel alignment apparatus known from DE 19757763 A1, the positioning of the measurement heads with respect to each other is carried out in that a separate frame with reference targets is arranged between the measurement heads and the vehicle, where the calibration of the measurement heads is carried out with the aid of the reference targets. In this case, the frame with the reference targets interferes with the installation of the apparatus and during the measurement procedure.

It has already been tried to use the measurement cameras themselves for calibrating the measurement heads, and to arrange reference targets on the measurement heads positioned obliquely opposite to each other with respect to the driving direction of the vehicle. In this case, there is the problem that the camera which serves for carrying out the measurement with respect to the position of the wheel opposite to the camera as well as for calibrating the relative position of the two measurement heads opposite to each other, has to be calibrated twice during each measurement run because of the required changes in the focal length of the camera. If such a camera is also used to provide the relationship to the diagonally opposite measurement head, three calibrations of the camera are necessary, and such calibrations are cumbersome.

SUMMARY OF THE INVENTION

In view of there both, it is an object of the invention to provide a wheel alignment apparatus which is designed to operate without a locally fixed reference system and in which the calibration maybe carried out with as few calibration works and hardware components as possible.

For achieving this object, the wheel alignment apparatus of the invention comprises an optical reference system integrated into the measurement heads for calibrating the measurement heads of the wheel alignment apparatus as to the position of the measurement heads with respect to each other. By means of such a references system it is possible in an advantageous way to use mobile measurement heads which are calibrated with respect to the positions to each other prior to the actual measurement.

According to an advantageous embodiment the invention provides a wheel alignment apparatus wherein the references system comprises a reference camera on one of the measurement heads on one side of the motor vehicle and a reference target which is arranged on the opposite measurement head on the same side of the vehicle as well as reference targets on the inside of a forward and a backward measurement head which reference targets are within the fields of view of the measurement cameras of the opposite measurement heads. This arrangement has the advantage that the measurement heads may be freely positioned according to the wheel distance (in driving direction) and the wheel distance transverse to the driving direction, where the measurement targets are positioned in the fields of view of the measurement cameras during the measurement procedure and the measurement and reference targets respectively are positioned in the fields of view of the measurement and reference cameras respectively when no vehicle is present on the measurement site. As compared to a system consisting of the measurement cameras and the measurement targets, only two additional cameras and four reference targets are required. The measurement heads are diagonally exchangeable, and a serf control can be carried out by means of a measurement on the bases of the measurement heads reaching completely around the vehicle. For calibrating purposes, the vehicle has to be removed from the measurement site.

According to an advantageous embodiment the invention provides a wheel alignment apparatus wherein the references system comprises a reference camera on one of the forward measurement heads and a reference target on the opposite measurement head, where the reference camera and the reference target are arranged in front of the vehicle, and wherein the references system further comprises a reference camera on one of the side measurement heads and a reference target on the opposite measurement head on the same side of the vehicle. Hereby, the advantage is achieved that the measurement heads may be position freely according to the wheel distance in the driving direction of the vehicle and to the wheel distance transversely to the driving direction of the vehicle as long as they my detect each other within their respective fields of view. Only three references cameras and targets are required in order to put up the reference system.

According to an advantageous embodiment the invention provides a wheel alignment apparatus wherein, furthermore, a reference camera is arranged on one of the back measurement heads and a reference target is arranged on the opposite measurement head. Herein, it is advantagoues that the measurement heads may be freely positioned according to the wheel distance in driving direction of the vehicle and the wheel distance transverse to the driving direction of the vehicle as long as they may detect each other within their respective fields of view. The measurement heads are diagonally exchangeable, and self-control of the wheel alignment apparatus is possible by means of the references system which completely surrounding the vehicle as it is the case with the so called eight-sensor wheel alignment apparatus.

According to an advantageous embodiment the invention provides a wheel alignment apparatus comprising an optical beam splitter or mirror system which is arranged between a reference target each and a measurement camera each such alive the reference targets are with in the field of side of the measurement camera. Since, by means of this arrangement, reference cameras are replaced by an optical beam splitter or mirror system, this arrangement has the advantage that a reference camera is saved by means of the beam splitter or mirror system which results in lower costs of the complete apparatus.

According to an advantageous embodiment the invention provides a wheel alignment apparatus wherein the references system comprises one CCD reference camera on each of the side measurement heads which CCD reference camera is directed to the opposite measurement head on the same side of the vehicle, and at least to LED elements each on the opposite measurement head as references targets, and wherein on the forward and/or back reference heads additional CCD reference cameras each and LED elements are arranged on the opposite measurement heads as reference targets. In this arrangement, only ordinary line-cameras and LED elements are required, while the measurement heads are adapted to be freely positioned and diagonally exchanged.

According to an advantageous embodiment the invention provides a wheel alignment apparatus wherein three LED elements are provided as reference targets. Here, only one CCD-reference camera is required for each measurement head which again serves to reduced costs.

According to an advantageous embodiment the invention provides a wheel alignment apparatus wherein the reference system comprises reference targets on the inside of the measurement heads and an optical reference unit between the reference targets which unit is directed to the reference targets. By means of this arrangement, a central reference unit for calibrating the wheel alignment apparatus is provided which is ready to use after installation and calibrating thereof at any time. The actual measurement heads for measuring the wheel positions may be embodied by relatively simple devices. As to the optical arrangement, the depths of focus of the measurement system and the reference system maybe defined and calibrated separately so that a re-calibration is required only seldom. The measurement heads in this arrangement are again diagonally exchange:

According to an advantageous embodiment the invention provides a wheel alignment apparatus wherein the optical reference unit comprises four cameras each directed to the reference targets. This arrangement has the advantage that a calibration of the reference system is necessary only once, and that no moving parts are placed in the reference unit.

According to an advantageous embodiment the invention provides a wheel alignment apparatus wherein the optical references unit comprises a reference camera and a mirror or beam splitter system which directs the field of view of the reference camera to the reference targets. By this arrangement, three cameras may be saved as compared to the previous embodiment.

According to an advantageous embodiment the invention provides a wheel alignment apparatus wherein the optical reference unit comprises a ratably mounted reference camera. The actual measurement heads for measuring the wheel positions may be embodied by compatibly simple devices, and the depths of focus of the measurement system and the references system can be defined and calibrated in a simple way. Since only one camera is required for the reference unit, a further reduction of costs as compared to the previous embodiment maybe achieved.

A further understanding of the nature and advantages of the embodiments of the present invention may be realized by reference to the remaining portions of the specification and the drawings.

DESCRIPTION OF THE SPECIFIC EMBODIMENTS

Figure 1:
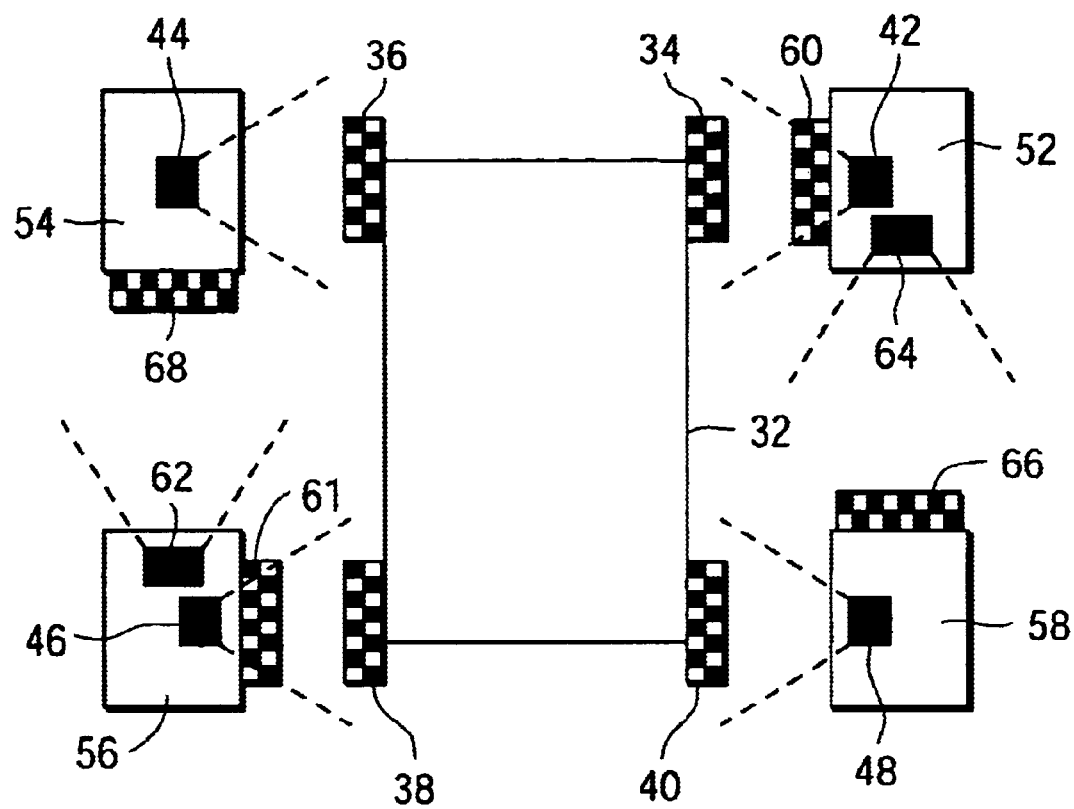
FIG. 1 is a schematic representation of the wheel alignment apparatus with reference targets and the measurement heads and reference cameras on the measurement heads.

FIG. 1 shows a wheel alignment apparatus having a references system integrated into the measurement heads. Measurement targets 34, 36, 38, 40 are arranged on the respective wheels of a schematical shown vehicle 32. The measurement targets are within the fields of view of measurement cameras 42, 44, 46 and 48 respectively when the wheel alignment measurement is carried out. The measurement cameras 42, 44, 46, 48 are arranged in measurement heads 52, 54, 56, 58 respectively.

The front of the vehicle 32 as well as of the vehicles of the following embodiments, is directed to the top of the respective drawing. This means that top two measurement heads or forward measurement heads of the embodiments are associated to the front wheels and the bottom two measurement heads or backward measurement heads are associated to the rear wheels of the vehicle.

Reference targets 60, 61 are arranged on the measurement heads 52 and 56 which reference targets are respectively within the fields of view of the measurement camera 44 and 48 respectively when no vehicle is present on the measurement site. The reference system is completed by reference cameras 62, 64 in the measurement heads of 44, 46 and reference targets 66, 68 on the measurement heads 58, 54. The target 66, 68 are within the fields of view of the reference cameras 64 and 62 respectively.

In this arrangement, the self-calibration of the measurement heads is carried out prior to the actual wheel alignment measurement. By means of the combination of the measurement head with the measurement targets and the measurement heads with the reference targets, the position and angular orientation of the measurement heads with respect to each other may be determined as long as no vehicle is on the measurement side. After the calibration, the vehicle is driven into the measurement site and the measurement is carried out.

Figure 2:
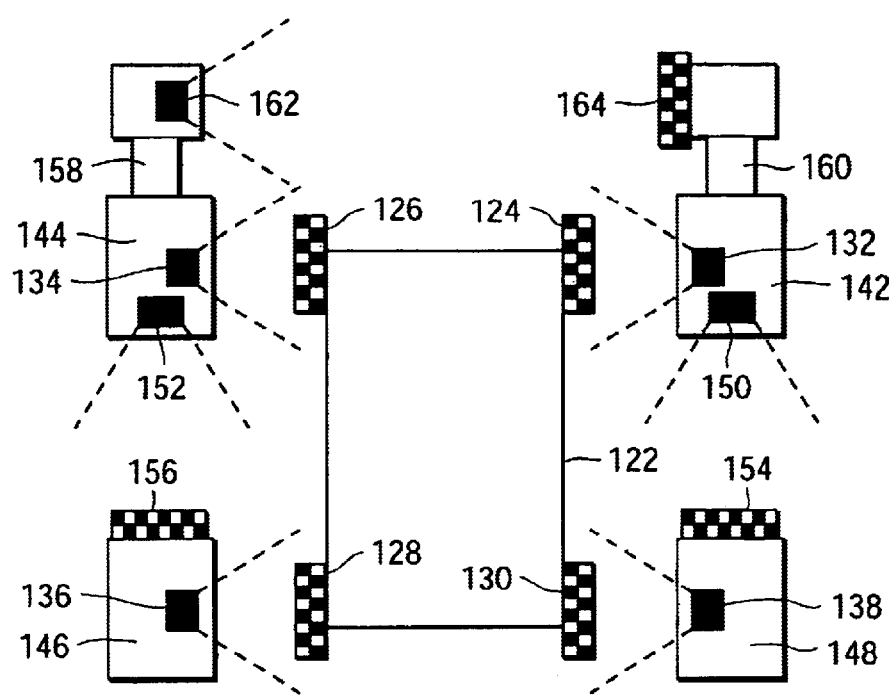
FIG. 2 is a schematic representation of a wheel alignment apparatus with a reference camera and a reference target on extension bares on the forward measurement heads.

FIG. 2 shows a wheel alignment apparatus having additional optical means on the measurement heads. A vehicle 122 comprises measurement targets 124, 126, 128, 130 on its wheels whereby the measured targets are within the fields of view of measurement cameras 132, 134, 136 and 138 respectively. The measurement cameras are arranged in measurement heads 142, 144, 146, 148. In the forward measurement heads 142, 144, reference cameras 150, 152 a arranged which have references targets 154, 156 within their fields of view which reference targets are arranged in the backward measurement heads 148 and 146 respectively. A reference camera 162 and a reference target 164 respectively are arranged on the forward measurement heads 144 and 142 respectively by means of extension bars 158, 160. In this arrangement, the reference cameras 150, 152 provide the spatial relationship between the forward measurement heads 142, 144 and the backward measurement heads 146, 148 by means of the reference targets 154, 156. The reference camera 162 and reference target 164 provide for the spatial relationship obliquely to the driving direction of the vehicle between the measurement heads arranged to the sides of the vehicle. In this arrangement, self-calibration of the measurement heads is carried out during a wheel alignment measurement.

Figure 3:
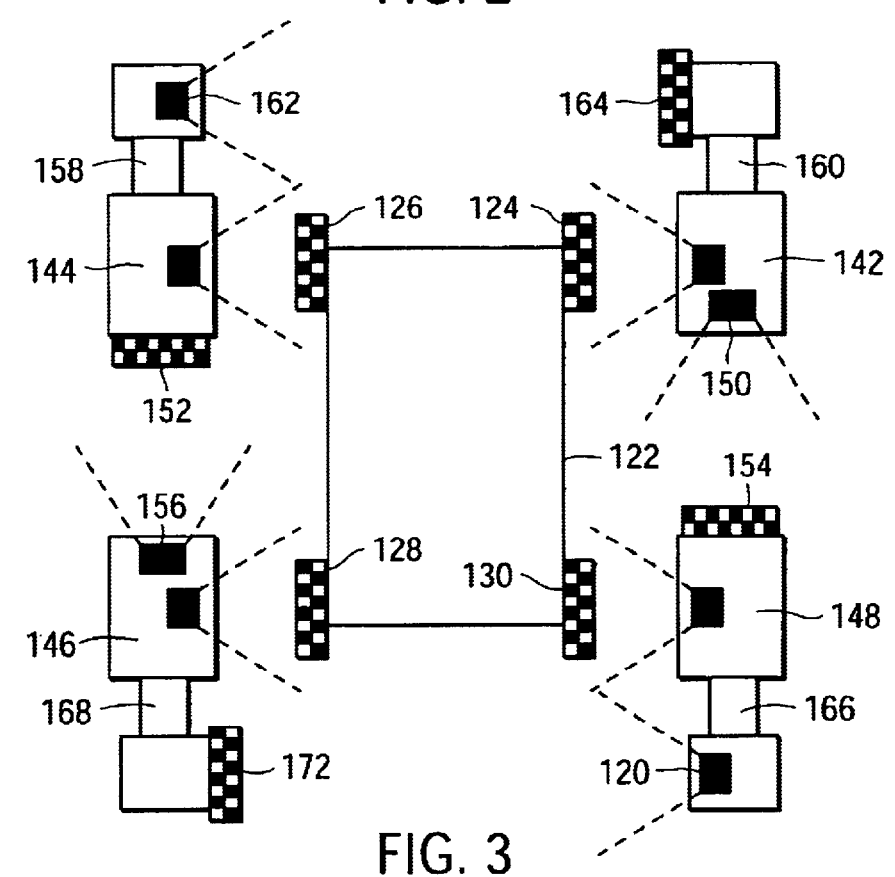
FIG. 3 is a schematic representation of a wheel alignment apparatus with a reference camera and reference targets opposite thereto on extension bars on the forward measurement heads and a identical arrangement on the backward measurement heads.

FIG. 3 shows a further development of the embodiment of FIG. 2. The wheel alignment apparatus of FIG. 3 has two additional extension bars 166, 168 at the backward measurement heads 148 and 146 respectively on which extension bars a reference camera 170 and a reference target 172 are arranged. In this arrangement, a so called all-around measurement is possible like in an eight-sensor wheel alignment apparatus, such that the calibration of the wheel alignment apparatus maybe subject to a self control.

Figure 4:
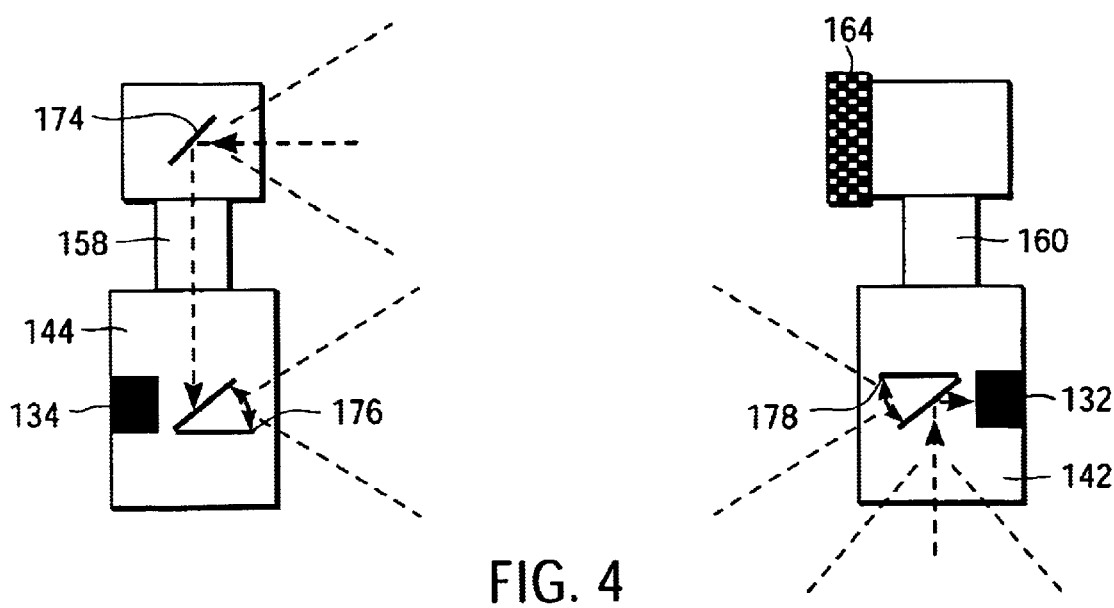
FIG. 4 is a representation of a mirror system in the forward measurement heads.

FIG. 4 shows a mirror system by which a camera is saved or replaced by the mirror system in each measurement head of the kind shown in FIG. 3. The camera 162 of FIG. 3 is saved in measurement head 144, and the camera 150 of FIG. 3 is saved in the measurement head 142. For this purpose, a mirror system 174 is arranged in the measurement head 144 on the extension bar 158, and a switching mirror system 176 is provided in the measurement head 144 itself, which system switches the beam from the measurement camera 134 from path to the mirror system 178 to a beam path to the opposite measurement target. A switching mirror system 178 is provided in the measurement head 142 which system switches the beam path of the measurement camera 132 between a beam path to the measurement target and a beam path to the reference target.

Figure 5:
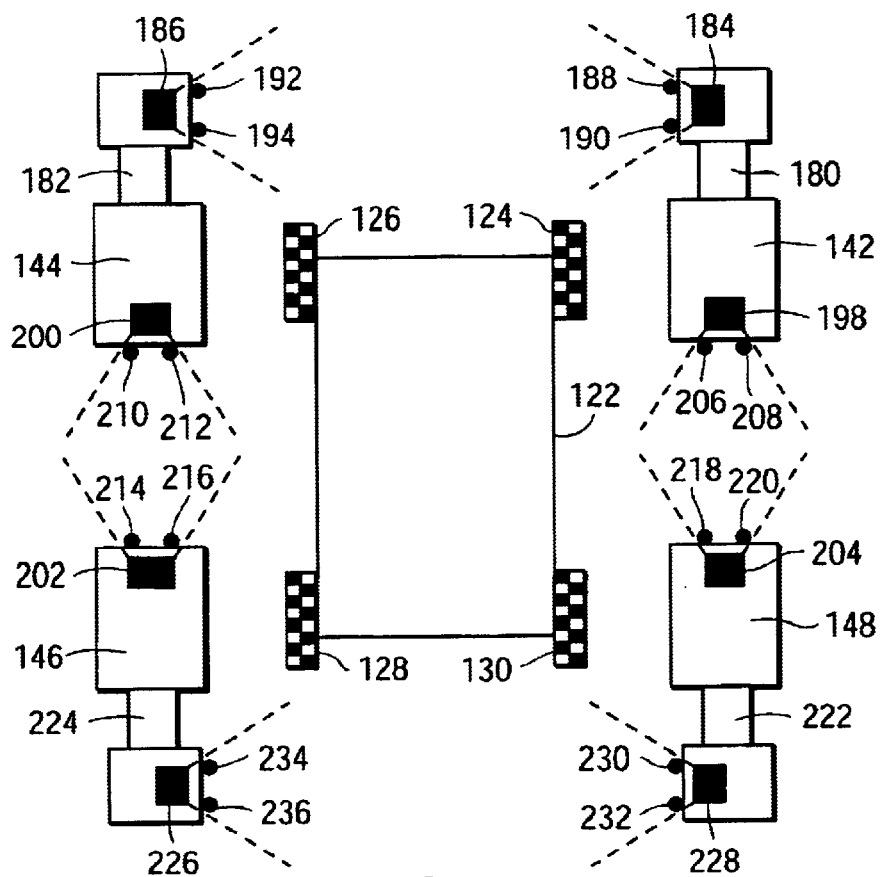
FIG. 5 is a schematic representation of a wheel alignment apparatus with a references unit comprising a CCD camera and LED elements.

The arrangement of the wheel alignment apparatus is according to FIG. 5 corresponds to the arrangement of FIG. 3. In FIG. 5, the measurement cameras for measuring the various wheel positions are not shown for simplicity. According to FIG. 5, the forward measurement heads 142, 144 comprise extension bars 180, 182 on which respective reference cameras 184, 186 are arranged comprising CCD lines and two LED elements 188, 190 and 192, 194 respectively. The LED elements 188, 189 and 192, 194 respectively are arranged in the fields of view of the reference cameras 186 and 184 respectively. With such an arrangement, the angular orientation of the measurement heads 142, 144 may be determined obliquely to the driving direction of the vehicle. A corresponding arrangement is provided between the measurement heads 142, 146 and 144, 146 respectively which are arranged opposite to each other at the sides of the vehicle. Accordingly, reference cameras (CCD-lines) 198, 200, 202, 204 and LED-elements 206, 208; 210, 211; 214, 216; 218, 220 are arranged respectively in the measurement heads 142, 144, 146, 148 which LED-elements are positioned respectively within the fields of view of the opposite reference cameras.

In the arrangement of the wheel alignment apparatus of FIG. 5 an arrangement corresponding to the arrangement on the forward portion of the vehicle is also provided on extension bars 222, 224 on the backward measurement heads 146, 148. A reference camera (CCD-line) 226 is provided on the measurement head 146, and a reference camera 228 is provided on the measurement head 148. Two LED-elements 230, 232 are within the field of view of the reference camera 126, and two LED-elements 234, 236 are within the field of view of the reference camera 228. Since to LED-elements are arranged opposite to a respective reference camera, the distance between the measurement heads with respect to each other maybe determent. The position of each measurement head with respect to the vertical direction maybe determined by a pendulum system. It is an advantage of this arrangement that simple line cameras may be used as reference cameras and that simple LED-elements may be used. Furthermore, the measurement heads may be positioned freely and are diagonally exchangeable.

Figure 6:
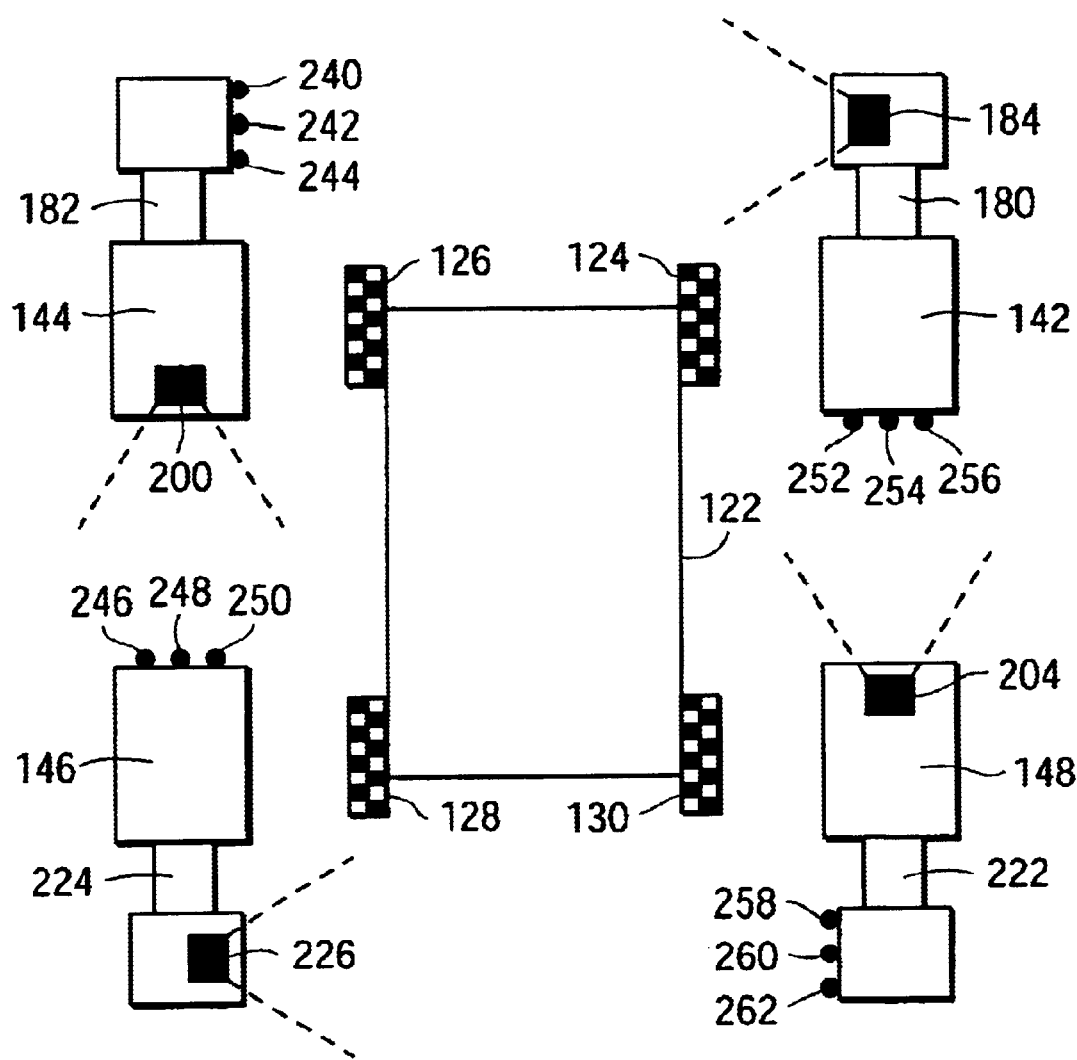
FIG. 6 is a schematic representation of a wheel alignment apparatus having CCD references cameras and three LED elements each as reference and targets.

FIG. 6 is a further development of the embodiment of FIG. 5 wherein three LED-elements for each reference camera are provided instead of two LED-elements as in the embodiment of FIG. 5. Thereby, one reference camera for each measurement head can be dispensed with. Three LED-elements 240, 242, 244 on the extension bar 182 of the measurement head 144 are arranged opposite to the reference camera 184 on the extension bar 180. Three LED-elements 246, 248, 250 on the measurement head 246 are arranged opposite to the reference camera 200 on the measurement head 144. Three LED-elements 252, 254, 256 are arranged opposite to the reference camera 204 on the measurement head 148. Finally, three LED-elements 258, 260, 262 on the extension bar 222 are arranged opposite to the reference camera 226 on the extension bar 224.

Figure 7:
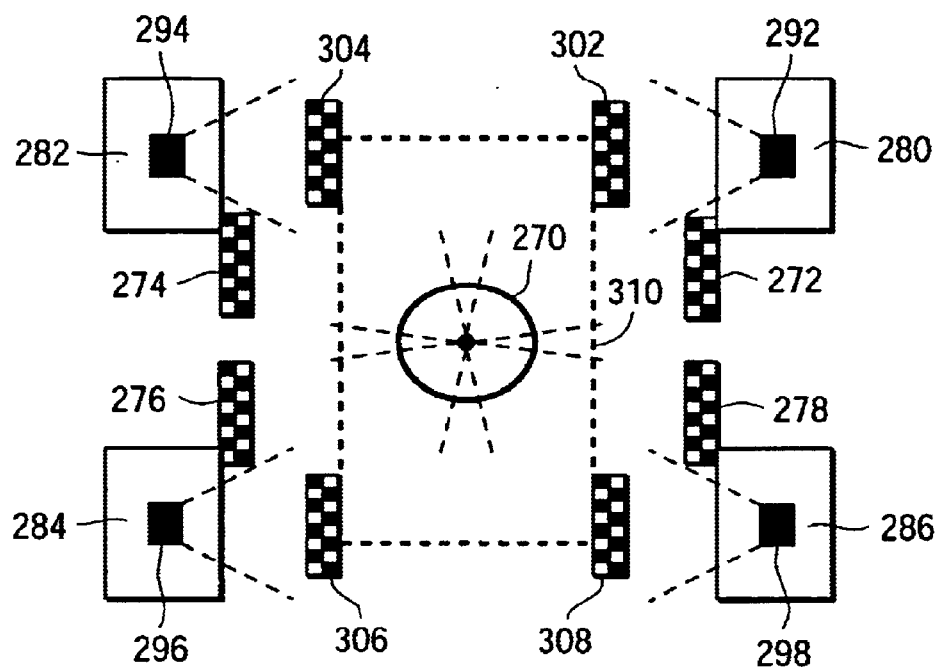
FIG. 7 is a schematic representation of a wheel alignment apparatus having an additional references unit centrally between the measurement heads.

FIG. 7 shows a wheel alignment apparatus having an optical reference unit 270 which is arranged in between the reference targets 272, 274, 276, 280 approximately in the middle of the wheel alignment apparatus. The reference targets are arranged on the inside of the measurement heads 280, 282, 284, 286. The reference unit 270 comprises also four fixedly arranged cameras or a camera with an additional mirror optic means in order to be able to detect all reference targets on the measurement heads without having to rotate the reference unit for calibrating the system.

Figure 8:
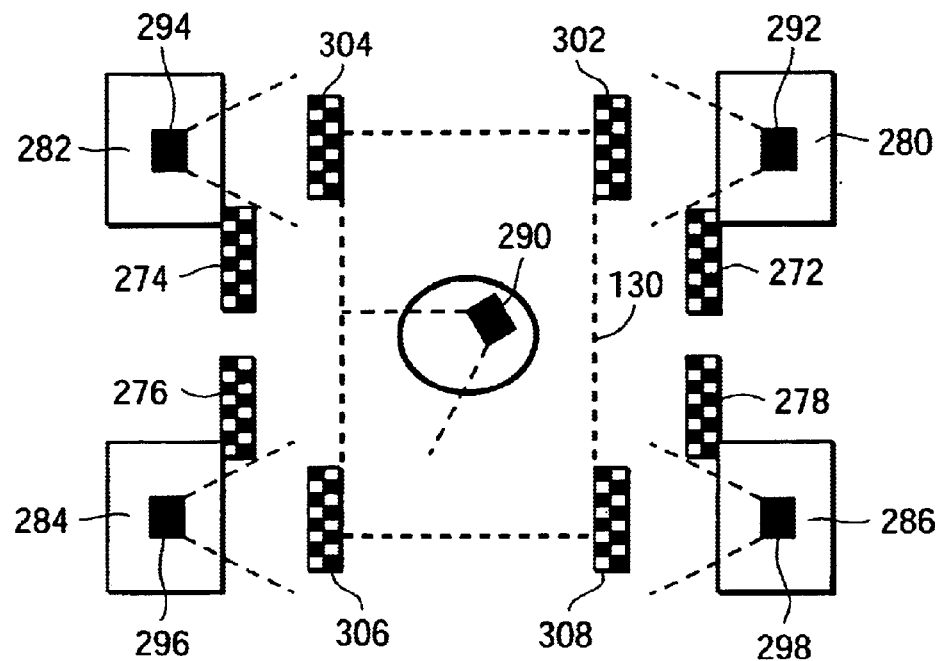
FIG. 8 is a schematic representation of a wheel alignment apparatus having another embodiment of a central references unit.

FIG. 8 shows a modified embodiment of the apparatus of FIG. 7 where the reference unit 270 comprises a rotatably mounted camera 290 by which is the reference targets 272, 274, 276, 278 may be detected.

Incidentally, in both embodiments of FIG. 7 and FIG. 8, measurement cameras 292, 294, 296, 298 are provided detecting the measurement target 302, 304, 306, 308 arranged on the wheels of a vehicle 310.

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the appended claims along with the full scope of equivalence to which such claims are entitled.

What is claimed is:

1. An optical reference system for a wheel alignment apparatus for a motor vehicle having wheels, the wheel alignment apparatus having measurement heads positioned opposite to and facing the wheels of the motor vehicle for measuring wheel alignment angles of the wheels, wherein the optical reference system comprises:
   a first reference camera on a first measurement head on one side of the motor vehicle;
   a first reference target on a second measurement head, wherein the second measurement head is opposite to the first measurement head on the same side of the vehicle, the first reference target being within the field of view of the first reference camera;
   a second reference target inside of a forward measurement head, wherein the second reference target is within the field of view of a second reference camera on a third measurement head opposite to the forward measurement head; and
   a third reference target inside of a rearward measurement head, wherein the third reference target is within the field of view of a third reference camera on a fourth measurement head opposite to the rearward measurement head and rearwards of the motor vehicle.

2. An optical reference system for a wheel alignment apparatus for a motor vehicle having wheels, the wheel alignment apparatus having measurement heads positioned opposite to and facing the wheels of the motor vehicle for measuring wheel alignment angles of the wheels, wherein the optical reference system comprises:
   a first reference camera on a first measurement head on one side of the motor vehicle;
   a first reference target on a second measurement head, wherein the second measurement head is opposite to the first measurement head on the same side of the vehicle, the first reference target being within the field of view of the first reference camera;
   a second reference camera on a third measurement head on the opposite side of the motor vehicle;
   a second reference target on a forth measurement head, wherein the forth measurement head is opposite to the third measurement head on the same side of the vehicle, the second reference target being within the field of view of the second reference camera;
   a third reference camera on a one forward measurement head; and
   a third reference target on the other forward measurement head opposite to the forward measurement head, wherein the third reference camera and the third reference target are arranged beyond the front of the motor vehicle.

3. The optical reference system of claim 2, wherein at least one of the measurement heads further comprises one or more optical beam splitters and a mirror system comprising one or more mirrors, to enable one of the cameras to selectively detect two of the reference targets.

4. The optical reference system of claim 2, further comprising:
   an additional reference camera on one rearward measurement head; and
   an additional reference target on the other rearward measurement head opposite to the one rearward measurement head, wherein the additional reference camera and the additional reference target are arranged behind the back of the motor vehicle.

5. The optical reference system of claim 4, wherein at least one of the measurement heads further comprises one or more optical beam splitters and a mirror system comprising one or more mirrors, to enable one of the cameras to selectively detect two of the reference targets.

6. An optical reference system for a wheel alignment apparatus for a motor vehicle having wheels, the wheel alignment apparatus having measurement heads positioned opposite to and facing the wheels of the motor vehicle for measuring wheel alignment angles of the wheels, wherein the optical reference system comprises:
   a first charge coupled device (CCD) reference camera on a forward side measurement head on one side of the motor vehicle, wherein the first CCD reference camera is directed to a rearward side measurement head opposite to the forward side measurement head on the same side of the motor vehicle;
   a first reference target on the rearward side measurement head, the first reference target comprising at least two light emitting diode (LED) elements;
   a second CCD reference camera on a rearward measurement head, wherein the second CCD reference camera is directed to a forward measurement head on the same side of the motor vehicle opposite of the rearward measurement head;
   a second reference target on the forward measurement head, the second reference target comprising at least two LED elements;
   a third charge coupled device (CCD) reference camera on a forward side measurement head on the other side of the motor vehicle, wherein the third CCD reference camera is directed to a rearward side measurement head opposite to the forward side measurement head on the same side of the motor vehicle;
   a third reference target on the rearward side measurement head, the first reference target comprising at least two light emitting diode (LED) elements;
   a fourth CCD reference camera on a rearward measurement head, wherein the fourth CCD reference camera is directed to a forward measurement head on the same side of the motor vehicle opposite to the rearward measurement head;
   a fourth reference target on the forward measurement head, the fourth reference target comprising at least two LED elements;
   a fifth CCD reference camera on one forward measurement head, wherein the fifth CCD reference camera is directed to the other forward measurement head opposite to the one forward measurement head on the opposite side of the motor vehicle; and
   a fifth reference target on the other forward measurement head, the fifth reference target comprising at least two LED elements;

a sixth CCD reference camera on the other forward measurement head, wherein the sixth CCD reference camera is directed to the one forward measurement head opposite to the other forward measurement head on the opposite side of the motor vehicle; and a sixth reference target on the one forward measurement head, the sixth reference target comprising at least two LED elements, wherein the fifth and sixth reference cameras and the fifth and sixth reference targets are arranged beyond the front of the motor vehicle.

7. The optical reference system of claim 6, wherein at least one of the measurement heads further comprises one or more optical beam splitters and a mirror system comprising one or more mirrors, to enable one of the cameras to selectively detect two of the reference targets.

8. The optical reference system of claim 6, further comprising:

a seventh CCD reference camera on one rearward measurement head, wherein the seventh CCD reference camera is directed to the other rearward measurement head opposite to the one rearward measurement head on the opposite side of the motor vehicle;

a seventh reference target on the other rearward measurement head, the seventh reference target comprising at least two LED elements;

an eighth CCD reference camera on the other rearward measurement head, wherein the eighth CCD reference camera is directed to the one rearward measurement head opposite to the one rearward measurement head on the opposite side of the motor vehicle; and an eighth reference target on the one rearward measurement head, the eighth reference target comprising at least two LED elements, where the seventh and eighth reference cameras and the seventh and eighth reference targets are arranged behind the back of the motor vehicle.

9. The optical reference system of claim 8, wherein at least one of the measurement heads further comprises one or more optical beam splitters and a mirror system comprising one or more mirrors, to enable one of the cameras to selectively detect two of the reference targets.

10. An optical reference system for a wheel alignment apparatus for a motor vehicle having wheels, the wheel alignment apparatus having measurement heads positioned opposite to and facing the wheels of the motor vehicle for measuring wheel alignment angles of the wheels, wherein the optical reference system comprises:

a first charge coupled device (CCD) reference camera on a forward side measurement head, wherein the first CCD reference camera is directed to a rearward side measurement head opposite to the forward side measurement head on the same side of the motor vehicle;

a first reference target on the rearward side measurement head, the first reference target comprising at least three light emitting diode (LED) elements;

a second CCD reference camera on a rearward measurement head, wherein the second CCD reference camera is directed to a forward measurement head on the same side of the motor vehicle opposite of the rearward measurement head;

a second reference target on the forward measurement head, the second reference target comprising at least three LED elements;

a third CCD reference camera on one forward measurement head, wherein the third CCD reference camera is directed to the other forward measurement head opposite to the one forward measurement head on the opposite side of the motor vehicle; and a third reference target on the other forward measurement head, the third reference target comprising at least three LED elements, wherein the third reference camera and the third reference target are arranged beyond the front of the motor vehicle.

11. The optical reference system of claim 10, wherein at least one of the measurement heads further comprises one or more optical beam splitters and a mirror system comprising one or more mirrors, to enable one of the cameras to selectively detect two of the reference targets.

12. The optical reference system of claim 10, further comprising:

a fourth CCD reference camera on one rearward measurement head, wherein the fourth CCD reference camera is directed to the other rearward measurement head opposite to the one rearward measurement head on the opposite side of the motor vehicle; and a fourth reference target on the other rearward measurement head, the fourth reference target comprising at least three LED elements, wherein the fourth reference camera and the fourth reference target are arranged behind the back of the motor vehicle.

13. The optical reference system of claim 12, wherein at least one of the measurement heads further comprises one or more optical beam splitters and a mirror system comprising one or more mirrors, to enable one of the cameras to selectively detect two of the reference targets.

14. An optical reference system for a wheel alignment apparatus for a motor vehicle having wheels, the wheel alignment apparatus having measurement heads positioned opposite to and facing the wheels of the motor vehicle for measuring wheel alignment angles of the wheels, wherein the optical reference system comprises:

reference targets one each on an inside of the measurement head; and an optical reference unit between the reference targets on the inside of the measurement heads, wherein the optical reference unit is directed to the reference targets.

15. The optical reference system of claim 14, wherein the optical reference unit comprises four cameras, wherein each of the four cameras is directed to a separate reference target of the reference targets on the inside of the measurement heads.

16. The optical reference system of claim 14, wherein the optical reference unit comprises a camera and one or more beam splitters and a mirror system comprising one or more mirrors, to enable the camera to detect the reference targets.

17. The optical reference system of claim 14, wherein the optical reference unit comprises a rotatably mounted reference camera to detect the reference targets.

* * * * *